United States Patent
Beaston

[11] Patent Number: 6,122,858
[45] Date of Patent: Sep. 26, 2000

[54] TROTLINE HOLDER

[76] Inventor: Bud Beaston, Rte. 2, Box 88, Sperry, Okla. 74073

[21] Appl. No.: 09/303,477

[22] Filed: Apr. 30, 1999

[51] Int. Cl.[7] .......................... A01K 97/06; A01K 91/18
[52] U.S. Cl. .............................................................. 43/57.3
[58] Field of Search ..................... 43/27.4, 54.1, 43/57.1, 57.3; 206/315.11

[56] References Cited

U.S. PATENT DOCUMENTS

| | | | |
|---|---|---|---|
| 1,634,030 | 6/1927 | Korkames | 43/57.3 |
| 1,997,243 | 4/1935 | Vanderhider et al. | 43/57.3 |
| 2,242,509 | 5/1941 | Coalson | 43/57.3 |
| 2,499,042 | 2/1950 | Vogel | 43/57.1 |
| 2,541,920 | 2/1951 | Hammock | 43/57.3 |
| 2,633,661 | 4/1953 | Stevens et al. | 43/57.3 |
| 2,804,716 | 9/1957 | Adkison | 43/57.3 |
| 3,803,750 | 4/1974 | Nunley | 43/57.3 |
| 3,842,530 | 10/1974 | Jackson et al. | 43/57.3 |
| 4,827,659 | 5/1989 | Gulley et al. | 43/57.3 |
| 5,107,618 | 4/1992 | Cummings et al. | 43/57.3 |
| 5,345,709 | 9/1994 | Cummings et al. | 43/57.3 |

*Primary Examiner*—Charles T. Jordan
*Assistant Examiner*—Darren W. Ark
*Attorney, Agent, or Firm*—Head, Johnson & Kachigian

[57] ABSTRACT

A holder for a trotline, the trotline having a plurality of spaced leader attached thereto, each leader having a fishhook secured to the free end thereof, each fishhook having a shank portion with an eye at one end for receiving the attachment of the free end of the leader and a curved portion at the opposite end of the shank portion with a barb adjacent a terminal pointed end of the curved portion, the trotline holder having a body horizontally extending elongated hollow having an open slot extending the length of the body, the body having an open front, and including a vertical support within the body and an elongated horizontal shelf affixed to an upper end of the vertical support, the trotline fishhooks being received on the shelf with the barbs positioned below the shelf and with the shank portion of each fishhook extending downwardly through the body open slot.

8 Claims, 2 Drawing Sheets

TROTLINE HOLDER

REFERENCE TO PENDING APPLICATIONS

This application is not related to any pending United States or international patent applications.

REFERENCE TO MICROFICHE APPENDIX

This application is not referenced in any Microfiche Appendix.

BACKGROUND OF THE INVENTION

Setting trotlines is a popular way to catch fish in the United States and many other countries of the world. Trotlines are especially effective in running streams but are also used in lakes. A trotline is a simple system consisting of a line of heavier cord that can be made of woven fibers that in the past were typically cotton fibers but at the present time are frequently plastic fibers. At space interval, leaders are attached to the trotline. Specifically, a leader, which usually is of a smaller diameter line, has one end attached to the trotline and the other end attached to a hook. The length of the main cord of a the trotline may be several feet up to several hundred feet. The typical leader is usually approximately 18–24 inches in length however this length can vary. At the outer end of the leader, a fishhook is attached.

After a trotline has been set in the water, such as from one bank to an opposite bank of a flowing stream, the fisherman places bait on each of the hooks. Weights may be employed for sinking the entire trotline below the surface of the water. The leaders allow movement of the bait at a space away from the main trotline so that the main line itself is not a distraction to fish.

Usually a trotline is placed in the water and baited in the evening and the next morning the fisherman runs the trotline to remove any fish that are caught and to replace the bait that has disappeared. The trotline may be baited just once a day or may be baited more frequently throughout a day according to the preference of the fisherman.

This method of fishing, as above indicated, is popular and commonly employed. One problem with trotlines is that of gathering up a trotline when it is removed from use in a body of water. Sometimes fisherman will individually remove the leaders from a trotline before taking up the main line so as to prevent the leaders and the hooks from becoming entangled with each other. However, this procedure is time consuming since it then requires the leaders to be reattached to the trotline when it is next used. A more common procedure employed by fisherman is to take up the trotline with the leaders and hooks still attached. A problem is to take up the line so that the leaders and hooks do not become entangled with each other so that the trotline can be readily re-deployed. To facilitate storing a trotline when not in use, others have provided trotline holders. Known type of trotline holders are exemplified by the following previously issued United States patents:

| U.S. Pat. No. | INVENTOR | TITLE |
| --- | --- | --- |
| 1,634,030 | Korkames | Fishing Line |
| 1,997,243 | Vanderhider et al. | Trot Line Holder and Setter |
| 2,242,509 | Coalson | Fishhook and Trotline Holder |
| 2,541,920 | Hammock | Fishing Hook and Line Carrier |
| 2,633,661 | Stevens et al. | Fishhook and Line Holder |
| 2,804,716 | Adkison | Fishing Trot Line Hook Retainer and Dispenser |
| 3,842,530 | Jackson et al. | Fishhook and Trotline Holder and Dispenser |
| 4,827,659 | Gulley et al. | Trotline Device |

The present invention is related to the basic subject matter shown in these patents. U.S. Pat. Nos. 1,997,243; 3,842,530 and 2,242,509 are most closely related to the present invention. Each of these show a housing into which individual fishhooks can be slidably positioned with a member in the housing retaining the fishhooks to allow the leaders and the trotline itself to hang downwardly from the housing. The present invention is directed to improvements in the basic type of trotline holder as revealed in these three last mentioned United States patents.

BRIEF SUMMARY OF THE INVENTION

This invention provides an improved holder for a trotline. The term "trotline" as used herein is a commonly employed fishing system in which an elongated trotline made of a flexible cord, usually of plastic fibers or cotton fibers, to which is attached a plurality of spaced apart leaders. More specifically, each leader has one end attached to the trotline and a free end. Secured to the free end is a fishhook. Each of the fishhooks has a shank portion with an eye at one end for receiving the attachment of the free end of the leader and a curved portion at the opposite end of the shank portion that terminates in a sharp pointed end with a barb extending from the shank portion spaced adjacent to the pointed end.

The trotline holder includes an elongated horizontally extending body having, in cross-section, a horizontal top plate, first and second vertical sidewalls extending from opposed longitudinal edges of the top plate and a horizontal bottom ledge plate extending from a lower edge of the first sidewall. The bottom ledge plate is spaced from the second sidewall providing an open slot extending substantially the length of the body. The body has an open front end and a closed rear end.

Each of the fishhooks making up the trotline has a width "w" between the barb and the shank portion of the hook.

A vertical support having a longitudinal upper edge is positioned within the body intermediate the sidewalls, the vertical support extending uprightly from the bottom ledge plate.

An elongated horizontal shelf is affixed to the upper edge of the vertical support. The shelf is positioned parallel to and spaced from the body top and sidewalls and has a width less than the width "w" of the fishhooks.

The trotline is stored by use of the holder by sliding fishhooks through the open end of the body and onto the elongated horizontal shelf. The barbs of each hook is positioned below the shelf and the shank portion of each hook extends downwardly through the body open slot.

In the preferred arrangement the width of the shelf is slightly less than the spacing "w" between the barb and the opposed shank portion of each of the fishhooks so that the barbs of the hooks extend below the horizontal shelf on which the hooks are supported. This relationship reduces the possibility of the hooks becoming inadvertently dislodged from the shelf but permits the hooks to be slid onto or off of the shelf.

In a preferred arrangement the shelf has a portion extending beyond the body open end that is turned upwardly to reduce the possibility of the hooks sliding off of the shelf.

A more complete understanding of the invention will be obtained from the following description of the preferred embodiment, taken in conjunction with the attached drawings.

DETAILED DESCRIPTION OF A PREFERRED EMBODIMENT

Figure 1:
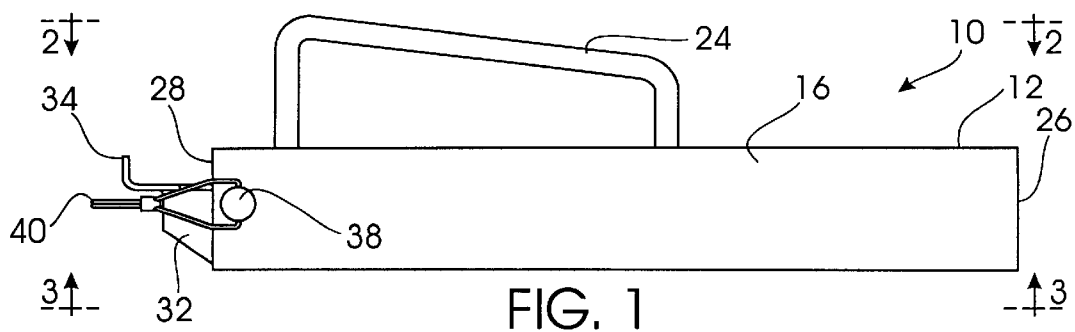
FIG. 1 is an elevational side view of the trotline holder of this invention.
Figure 2:
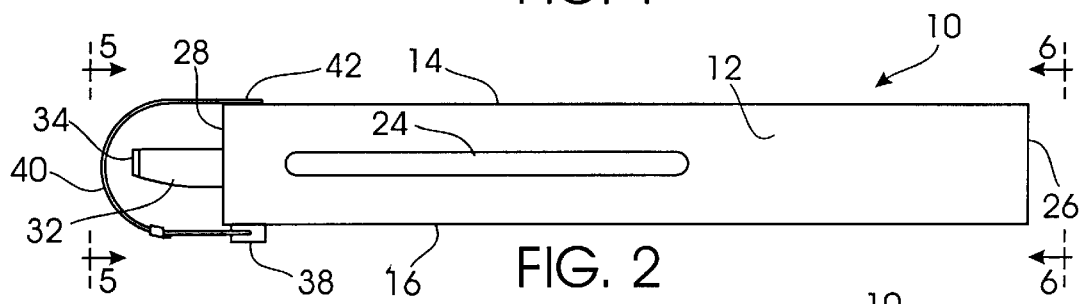
FIG. 2 is a top plane view of the trotline holder as taken along the line 2—2 in FIG. 1.
Figure 3:
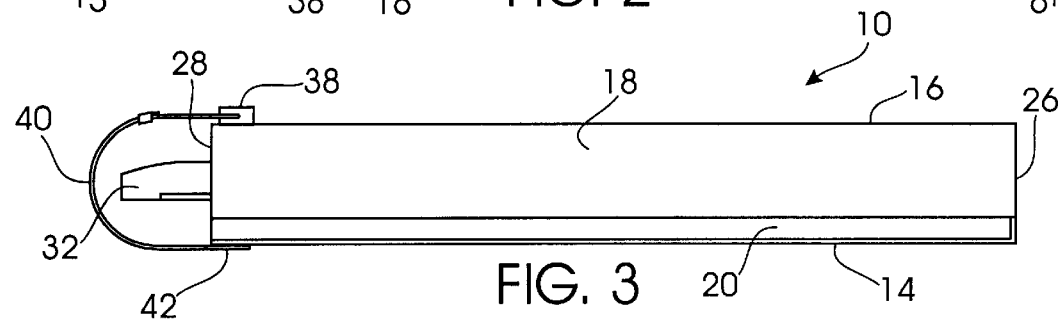
FIG. 3 is a bottom view of the trotline holder as taken along the line 3—3 of FIG. 1.
Figure 4:
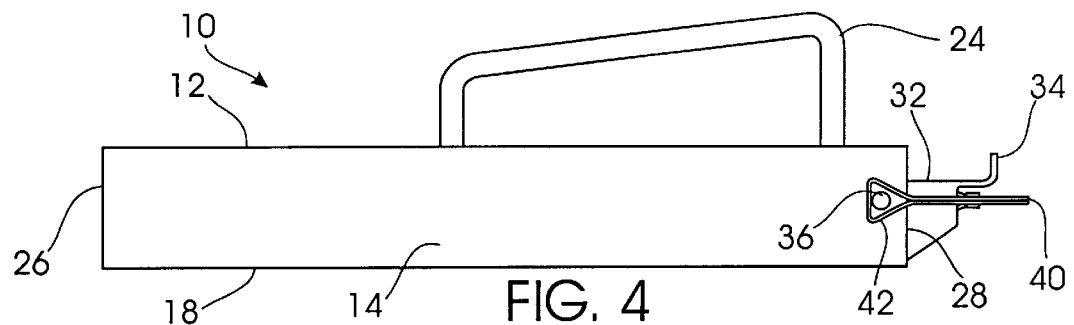
FIG. 4 is an elevational view of the opposite side of the trotline holder, that is the side opposite that shown in FIG. 1.

Referring to the drawings and first to FIGS. 1—6, the external appearance of a trotline holder of this invention are shown. The trotline holder includes a body generally indicated by the numeral 10. The body 10 is elongated, has a horizontal top plate 12, a first vertical sidewall 14 and an opposed second vertical sidewall 16. Vertical sidewalls 14 and 16 extend downwardly from opposed edges of top plate 12.

A bottom plate 18 extends horizontally from a lower edge of second vertical plate 16. Bottom plate 18 is of width less than the width of top plate 12 so that it does not connect with first vertical sidewall 14, thereby leaving a longitudinal slot 20 in the bottom surface as seen particularly in FIGS. 3 and 5.

Secured to top plate 12 is a handle 24 that can be made of a rod that is circular in cross-section, as an example. The shape and configuration of handle 24 can vary considerably.

The body of the trotline holder consisting of top plate 12, vertical sidewalls 14 and 16 and bottom plate 18 can be formed of a single piece of metal, preferably aluminum or steel that is bent into the desired configuration, or the body 10 can be formed of plastic or fiberglass. The body has a closed rearward end 26 and an open front end 28.

Figure 5:
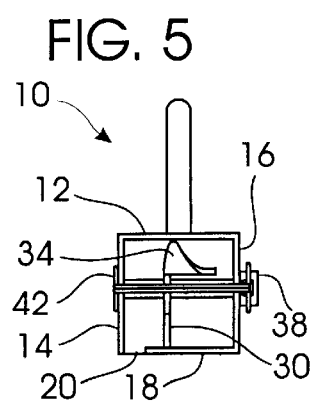
FIG. 5 is an elevational end view of the front end of the trotline holder as taken along the line 5—5 of FIG. 2.
Figure 6:
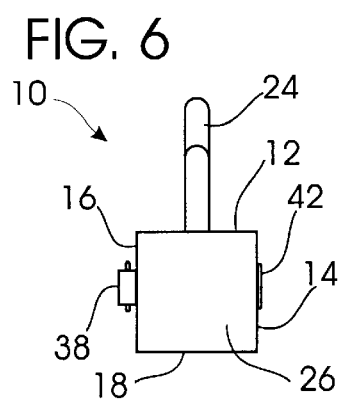
FIG. 6 is an elevational view of the closed end of the trotline holder as taken along line 6—6 of FIG. 2.
Figure 9:
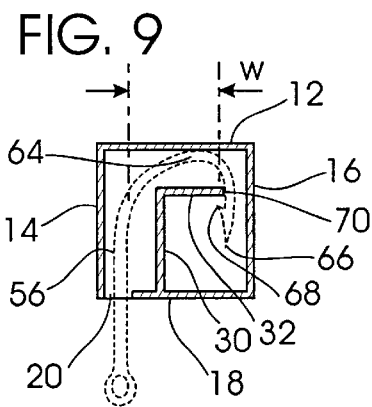
FIG. 9 is an elevational cross-sectional view of the trotline holder as taken along the line 9—9 of FIG. 7 and showing a hook positioned within the holder body and supported on the horizontal shelf illustrating how the shelf functions to prevent the inadvertent dislodgment of a hook from the body.

Positioned within the interior of body 10 and extending upwardly from bottom plate 18 is a vertical support 30 (see FIGS. 5 and 9). Extending horizontally from vertical support 30 is an elongated horizontal shelf 32. The horizontal shelf extends out the open front end 28 of the body and has an upturned portion 34 as best seen in FIGS. 1 and 5. The upturn portion 34 may be tapered as seen best in FIG. 5. The function of the shelf and the upturned portion are important to the invention as will be described subsequentially.

Vertical support 30 is shown to be in the form of a flat plate however this is optional. Instead of a single solid flat plate vertical support 30 could be a plurality of spaced apart vertical posts.

To retain a trotline within the holder body aligned openings 37 are formed in the opposed first and second vertical sidewalls 14 and 16. A pin 36 extends through openings 37. Pin 36 has an enlarged diameter head 38 at one end. A bale 40 is pivotally attached to head 38, the bale having a closed loop 42 at a free end thereof. With the bale in place in the free end 42 is snapped over the outer end of pin 36. Thus the pin is prevented from becoming disengaged from the trotline holder body and hooks that are received within the body are prevented from inadvertently sliding off the outer end portion of horizontal shelf 42.

Figure 7:
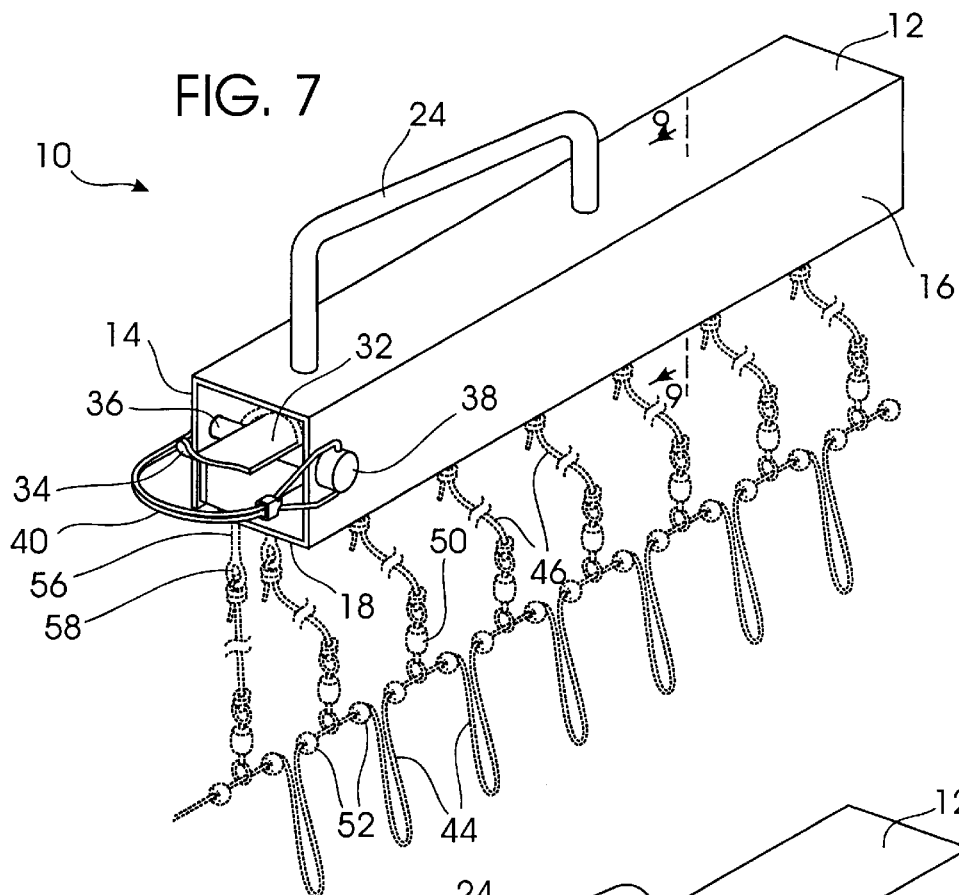
FIG. 7 is an isometric view of the trotline holder shown in FIGS. 16, showing in dotted outline portions of a trotline as supported by the trotline holder.
Figure 8:
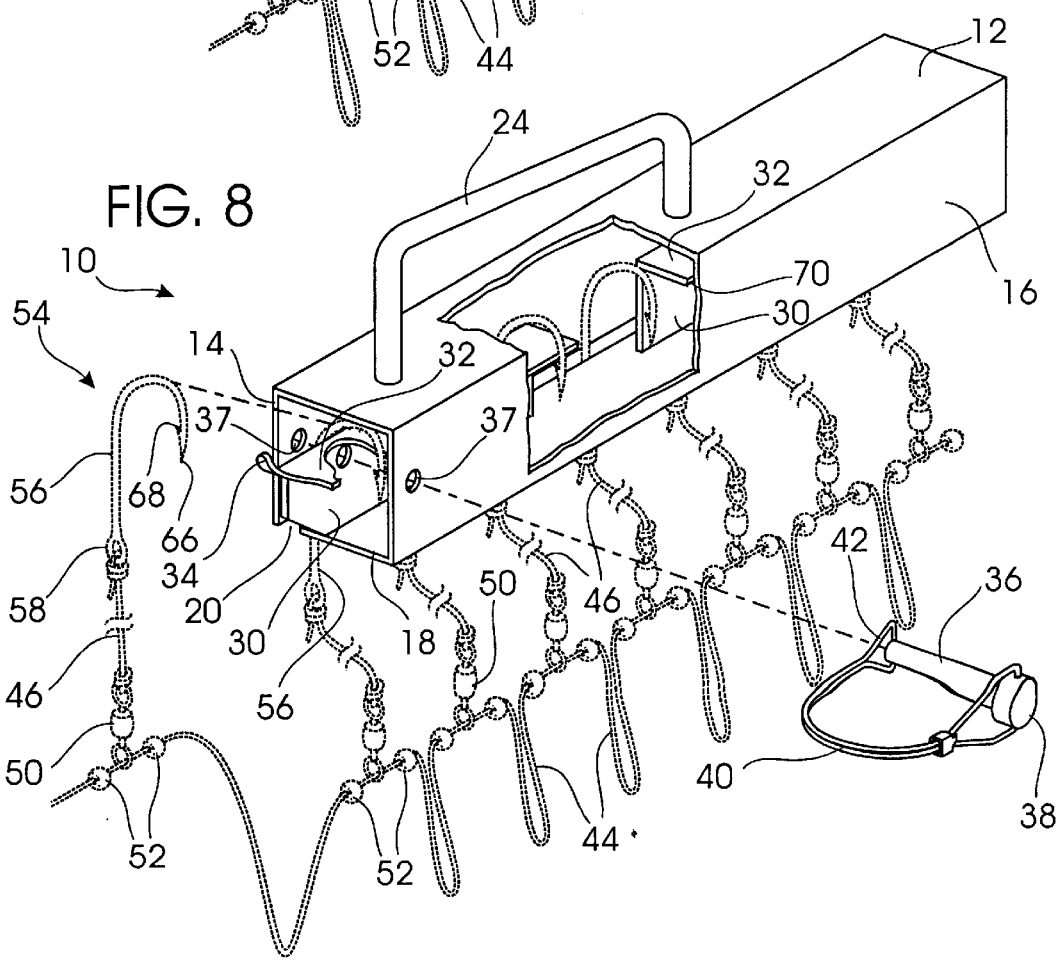
FIG. 8 is an isometric view of the trotline holder of this invention with the portions of a trotline shown in dotted outline and showing a safety catch removed from the trotline holder and showing one hook and leader having been removed from the holder.

The use of the trotline holder of this invention is illustrated best in the isometric views of FIGS. 7 and 8, taken in conjunction with the cross-sectional view of FIG. 9. FIGS. 7 and 8 show a trotline in dotted outline with the trotline 44 having spaced apart leaders 46. Each leader has an inner end attached to trotline 44. In the illustrated arrangement each leader is provided at its inner end with a swivel 50 but this is entirely optional as many, if not most, trotlines do not employ swivels 50. Further, in the illustrated arrangement the inner end of each of the swivels 50 has a loop received on trotline 44 between spaced apart beads 52 secured to the trotline to retain each leader in its selected spaced position compared to the other leaders making up the trotline. Many, if not most trotlines do not use beads 52 that is, most trotlines in common practice are not as thoughtfully constructed as shown in FIGS. 7 and 8 but instead merely have the inner end of each leader 46 tied to the trotline 44.

At the outer end of each leader 46 is a fishhook 54. Each fishhook 54 includes a shank portion 56 that has, as seen in FIG. 8, at one end an eyelet 58 that receives an outer end of a leader 46. Each hook 54 includes an integral curved portion 64 that terminates in a pointed end 66. Spaced near pointed end 66 of each fishhook is a barb 68 as seen in FIGS. 8 and 9. There is a spacing "w" (see FIG. 9) between barb 68 and hook shank portion 56.

The use of the trotline holder will now be described with reference to FIGS. 7, 8 and 9. The hooks 54 of a trotline are slid through the open front end 28 of holder body 10 with the curve portion 64 of each hook resting upon horizontal shelf 32. The width "w" between the barb 68 and shank portion 56 of the hooks is preferably slightly greater than the width of shelf 32, so that the barb 68 of each hook as it is positioned on shelf 32 extend beyond an outer longitudinal edge 70 of the shelf (see FIG. 9). This permits the hooks to be easily slidably positioned onto shelf 32 with the barbs sliding underneath longitudinal outer edge 70 however this relationship resists the inadvertent displacement of the hooks from the ledge.

It should be understood that the relative width of shelf 32 and the spacing "w" of the hooks can vary within a significant range but the shape of the curved portion 64 of each of the hooks is such as to naturally withdraw the barb 68 underneath horizontal plate 32.

When all of the hooks making up a trotline are threaded into the body 10 with the shank portion 56 of each hook extending downwardly through slot 20 in the bottom of the body and with the leaders 46 and the trotline 44 hanging downwardly from the body, a fisherman can store the trotline without it becoming entangled. When the fisherman wishes to redeploy the trotline, a free end is secured to one part of a body of water and the trotline is stretched to an adjacent point in the body of water, either by the fisherman wading or from a boat. Hooks are separately slid off of horizontal shelf 32 and out the open front end 28 of the body 10. The upturned end 34 of shelf 32 help prevent the hooks from being inadvertently moved out from within the body.

The invention could be constructed to incorporate the principles explained herein and in a way so that it has a completely different external appearance. For instance, the body 10 may, rather than being rectangular in cross-section as illustrated, could be circular as long as provision is made within an elongated enclosed body to have a horizontal shelf 32 and a bottom slot 20 so that the horizontal shelf supports the fishhooks in a way that the barbs extend beyond a longitudinal edge of a shelf with the shank portions of each of the hooks extending downwardly through an open slot in the bottom of the body.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A holder for a trotline, the trotline having a plurality of spaced apart leader attached thereto, each leader having a fishhook attached to a free end thereof, each fishhook
    having a shank portion with an eye at one end for receiving attachment of the free end of a leader and a curved portion at the opposite end of the shank portion with a barb adjacent a terminal pointed end of the curved portion, each hook having a width w between the barb and the shank, the trotline holder comprising:
    an elongated horizontally extending substantially hollow body with a lower portion having a substantially full open slot, the body having an open front end;
    a vertical support secured within said body adjacent said open slot;
    an elongated horizontal planar shelf within and extending substantially the full length of said body and affixed to an upper end of said vertical support, the planar shelf being substantially perpendicular to said vertical support and having a width less that said width w of said fishhooks, said fishhooks being receivable on the shelf with said barbs positioned below the shelf and with said fishhook shank portions extending downwardly through said body open slot, and
    a closure member in the form of a pin extending through opposed openings in said body sidewalls for removably closing said body open front end.

2. A holder for a trotline according to claim 1 including:
   a handle affixed to and extending upwardly from said body.

3. A holder for a trotline according to claim 1 wherein said horizontal shelf has a front end portion extending outwardly of said body open front end, the shelf front end portion being upturned to extend substantially vertically upwardly to thereby resist fishhooks sliding off of said shelf.

4. A holder for a trotline according to claim 1 wherein said horizontal shelf is of a width substantially equal to and slightly less than said width w of said fishhooks whereby the fishhook barbs rest below said shelf to thereby decrease the possibility of the fish hooks being displaced from said shelf other than by sliding the hooks off said shelf at said body open front end.

5. A holder for a trotline, the trotline having a plurality of spaced apart leader attached thereto, each leader having a fishhook attached to a free end thereof, each fishhook having a shank portion with an eye at one end for receiving attachment of the free end of a leader and a curved portion at the opposite end of the shank portion with a barb adjacent a terminal pointed end of the curved portion, each hook having a width w between the barb and the shank, the trotline holder comprising:
    an elongated horizontally extending body having, in cross-section, a horizontal top plate, first and second vertical sidewalls extending from opposed longitudinal edges of said top plate and a horizontal bottom ledge plate extending from a lower edge of said first sidewall, the bottom ledge plate having a longitudinal edge spaced from said second sidewall providing an open slot extending substantially the length of said body, the body having an open front end and a closed rear end;
    a vertical support within said body intermediate said sidewalls and extending uprightly from said bottom ledge plate;
    an elongated horizontal planar shelf affixed to an upper end of said vertical support, the shelf being spaced from said body top plate and sidewalls and parallel to said body top plate, the planar shelf being substantially perpendicular to said vertical support and having a width less that said width w of said fishhooks, said fishhooks being receivable on the shelf with said barbs positioned below the shelf and with said fishhook shank portions extending downwardly through said body open slot, and
    a closure member in the form of a pin extending through opposed openings in said body sidewalls for removably closing said body front end.

6. A holder for a trotline according to claim 5 including:
   a handle affixed to and extending upwardly from said body top plate.

7. A holder for a trotline according to claim 5 wherein said horizontal shelf has a front end portion extending outwardly of said body front end, the front end portion being substantially vertically upturned to thereby resist fishhooks sliding off of said shelf.

8. A holder for a trotline according to claim 5 wherein said horizontal shelf is of a width substantially equal to and slightly less than said width w of said fishhooks whereby the fishhook barbs rest below said shelf to thereby decrease the possibility of the fish hooks being displaced from said shelf other than by sliding the hooks off said shelf at said body front end.

* * * * *